(12) United States Patent
Watanabe et al.

(10) Patent No.: US 9,051,203 B2
(45) Date of Patent: Jun. 9, 2015

(54) BLACK SYNTHETIC QUARTZ GLASS WITH TRANSPARENT LAYER AND METHOD FOR PRODUCING THE SAME

(75) Inventors: Hiroyuki Watanabe, Fukushima (JP); Takayuki Imaizumi, Fukushima (JP); Tatsuhiro Sato, Fukushima (JP)

(73) Assignee: Shin-Etsu Quartz Products Co., Ltd., Shinjuku-ku, Tokyo (JP)

( * ) Notice: Subject to any disclaimer, the term of this patent is extended or adjusted under 35 U.S.C. 154(b) by 234 days.

(21) Appl. No.: 13/614,398

(22) Filed: Sep. 13, 2012

(65) Prior Publication Data
US 2014/0072811 A1    Mar. 13, 2014

(51) Int. Cl.
| | |
|---|---|
| *B32B 17/06* | (2006.01) |
| *C03B 20/00* | (2006.01) |
| *C03C 17/04* | (2006.01) |
| *C03C 4/02* | (2006.01) |
| *C03C 3/06* | (2006.01) |
| *C03C 4/08* | (2006.01) |
| *C03B 19/14* | (2006.01) |

(52) U.S. Cl.
CPC ............. *C03B 20/00* (2013.01); *C03C 17/04* (2013.01); *C03C 4/02* (2013.01); *C03C 3/06* (2013.01); *C03C 4/08* (2013.01); *C03C 2203/44* (2013.01); *C03B 19/1453* (2013.01); *C03B 19/1469* (2013.01)

(58) Field of Classification Search
CPC .......... B32B 9/00; B32B 17/00; B32B 17/06; B32B 2250/00; B32B 2250/02; B32B 2255/00; B32B 2255/20; B32B 2309/02; B32B 2309/022; C03C 3/00; C03C 3/04; C03C 3/06; C03C 4/02; C03C 15/00; C03C 17/00; C03C 17/02; C03C 17/23; C03C 17/25; C03C 27/00; C03C 2217/00; C03C 2217/20; C03C 2217/21; C03C 2217/213
USPC .......... 428/426, 428, 688, 689, 699, 701, 702
See application file for complete search history.

(56) References Cited

U.S. PATENT DOCUMENTS

| | | | | |
|---|---|---|---|---|
| 5,836,860 | A * | 11/1998 | Watanabe et al. | ............... 492/56 |
| 6,030,328 | A * | 2/2000 | Watanabe et al. | ............... 492/56 |
| 6,062,283 | A * | 5/2000 | Watanabe et al. | ............. 152/510 |
| 6,319,624 | B1 * | 11/2001 | Watanabe et al. | ............. 428/329 |
| 6,397,912 | B1 * | 6/2002 | Watanabe et al. | ............. 152/510 |
| 7,841,211 | B2 * | 11/2010 | Sato et al. | ...................... 65/32.1 |

(Continued)

FOREIGN PATENT DOCUMENTS

| | | |
|---|---|---|
| JP | 3156733 A | 10/1993 |
| JP | 2000-281430 A | 10/2000 |

(Continued)

*Primary Examiner* — David Sample
*Assistant Examiner* — Lauren Colgan
(74) *Attorney, Agent, or Firm* — McGlew and Tuttle, P.C.

(57) ABSTRACT

Provided in a facile manner are a black synthetic quartz glass with a transparent layer, which meets demands for various shapes, has a black portion satisfying required light shield property and emissivity in an infrared region, keeps a purity equivalent to that of a synthetic quartz glass in terms of metal impurities, has a high-temperature viscosity characteristic comparable to that of a natural quartz glass, can be subjected to high-temperature processing such as welding, does not release carbon from its surface, and is free of bubbles and foreign matter in the transparent layer and the black quartz glass, and at an interface between the transparent layer and the black quartz glass, and a production method therefor.

8 Claims, 1 Drawing Sheet

(56) References Cited

U.S. PATENT DOCUMENTS

2006/0059948 A1* 3/2006 Sato et al. .................. 65/32.1
2009/0098370 A1* 4/2009 Sato et al. .................. 428/333
2014/0072811 A1* 3/2014 Watanabe et al. ........... 428/428

FOREIGN PATENT DOCUMENTS

| JP | 2007-261875 A | 10/2007 |
| JP | 2009-91221 A | 4/2009 |

* cited by examiner

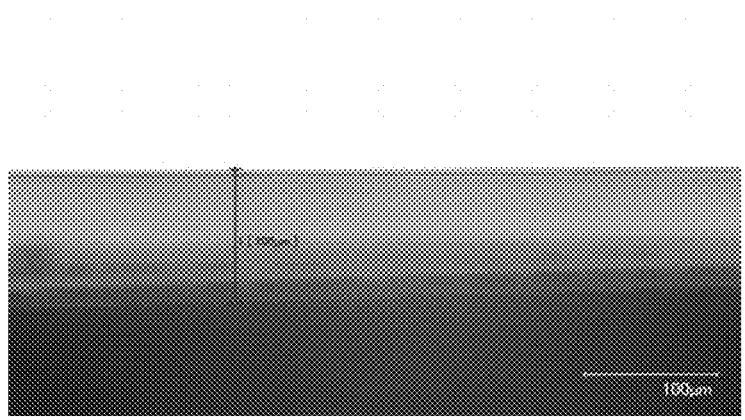

BLACK SYNTHETIC QUARTZ GLASS WITH TRANSPARENT LAYER AND METHOD FOR PRODUCING THE SAME

BACKGROUND OF THE INVENTION

1. Field of the Invention

The present invention relates to a black synthetic quartz glass with a transparent layer and a method for producing the same. The black synthetic quartz glass with a transparent layer of the present invention is suitably used for an optical component such as a spectroscopic cell, an infrared heat-absorbing member, a plasma etching-resistant member, a light-shielding member for a semiconductor production apparatus, and the like.

2. Description of the Related Art

A quartz glass is used in the field of optics such as a spectroscopic cell through utilization of its satisfactory light transmission property over ultraviolet to infrared regions and low thermal expansion property. Conventionally, in this field, a black glass obtained by adding a trace amount of a transition metal oxide to the quartz glass has been used for a part where local light shielding is required, and an optical cell has been produced by, for example, bonding the black glass to a transparent quartz glass through thermocompression bonding or the like. In recent years, however, in association with progressive reductions in size and thickness of the optical cell, there have been some cases where the conventional black glass has been insufficient in terms of light-shielding property. Accordingly, there has been a demand for a black quartz glass which has higher light-shielding property, is free of bubbles, foreign matter, and the like, thereby being highly homogeneous, and can be readily bonded to the transparent quartz glass.

Further, the quartz glass also has features of heat resistance and high chemical purity, and hence has been widely used for, for example, jigs for semiconductor production. In this regard, in recent years, a heat treatment step in a semiconductor production process has been more and more frequently performed in a high temperature region of more than 1,000° C. Accordingly, there has been an increasing demand for high heat resistance. Further, in a rapid heating process using infrared light, heat loss due to the transparent quartz glass through which the infrared light passes has been a problem, and hence there has also been a demand for a member for shielding components except an object to be heated from infrared irradiation. For these reasons, there has been a demand for development of a black quartz glass which is excellent in heat resistance, effectively shields infrared rays, has rapid heating and cooling properties, is excellent in thermal insulation property, is resistant to thermal shock at the time of rapid heating and cooling, and moreover, is free of metal impurities which cause process contamination.

As a black glass containing silica as a main component, the following glasses have been conventionally known. For example, Patent Document 1 proposes a black quartz glass obtained by adding a metal compound to a quartz glass. However, the black quartz glass of this kind is not sufficient in light-shielding property in some cases, and the metal component contained therein may cause process contamination. Accordingly, application of such glass to the semiconductor production field involves difficulties.

Further, Patent Document 2 proposes a black quartz glass obtained by adding an organic binder capable of serving as a carbon source to silica powder, subjecting the mixture to heat treatment to generate decomposed carbon, and then firing the resultant to dissolve the carbon in a glass network. However, such glass body having carbon dissolved therein is known to have mechanical and thermophysical properties that are different from those of a general quartz glass, such as increased hardness and increased high-temperature viscous property. Its thermal expansion rate is considered to change as well. Accordingly, such glass body has a difficulty such as causing a crack when used by being bonded or fitted to a general transparent quartz glass. In addition, in a heating atmosphere, the following problems arise. Carbon in the vicinity of a surface scatters into an ambient atmosphere to exert an adverse influence, and silica and carbon undergo reactions to generate air bubbles, which makes it impossible to perform welding or flame processing. In addition, for example, air bubbles are generated from an interface between the transparent quartz glass and the black quartz glass during use under heating, causing a crack in a product being used.

Further, Patent Document 3 describes a method involving placing a hydroxy group-containing porous quartz glass body having a desired shape in an atmosphere of a volatile organosilicon compound, heating the glass body to cause a reaction, and then heating and sintering the resultant in a vacuum, thereby forming a quartz glass transparent layer having a thickness of about 1 mm to 10 mm on a surface of the black quartz glass body having a desired shape. In this method, however, it is difficult to produce quartz glass jigs having various shapes, and it is also difficult to appropriately adjusting the thickness of the transparent layer while keeping a degree of blackness that satisfies required light-shielding property and emissivity in the infrared region.

PRIOR ART DOCUMENTS

Patent Documents

Patent Document 1: Japanese Patent No. 3156733
Patent Document 2: JP 2000-281430 A
Patent Document 3: JP 2009-91221 A

SUMMARY OF THE INVENTION

An object of the present invention is provide in a facile manner a black synthetic quartz glass with a transparent layer, which meets demands for various shapes, has a black portion satisfying required light shield property and emissivity in an infrared region, keeps a purity equivalent to that of a synthetic quartz glass in terms of metal impurities, has a high-temperature viscosity characteristic comparable to that of a natural quartz glass, can be subjected to high-temperature processing such as welding, does not release carbon from its surface, and is free of bubbles and foreign matter in the transparent layer and the black quartz glass, and at an interface between the transparent layer and the black quartz glass, and a method for producing the same.

The inventors of the present invention have made extensive studies in order to solve the above-mentioned problems. As a result, the inventors have developed the following black synthetic quartz glass body with a transparent layer and a method for producing the same.

That is, a method for producing a black synthetic quartz glass with a transparent layer according to a first exemplary embodiment of the present invention is a method for producing a black synthetic quartz glass with a transparent layer including a black quartz glass portion and a transparent layer quartz glass portion, the method including: a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, in which: the transparent layer preparing step includes coating the black quartz glass portion with silica slurry, performing heating treatment in an oxidizing atmosphere in the temperature region of 300° C. to 1,200° C., and keeping the resultant within the temperature range of 1,300° C. to 2,000° C. and the pressure range of 0.001 to 1.0 MPa to perform sintering; and the silica slurry uses silica particles each having an average particle diameter of 0.1 μm to 100 μm and has a concentration of silica of 50 to 95% and a concentration of a cellulose derivative of 0.05 to 10%.

The cellulose derivative is suitably methylcellulose.

A method for producing a black synthetic quartz glass with a transparent layer according to a second exemplary embodiment of the present invention is a method for producing a black synthetic quartz glass with a transparent layer including a black quartz glass portion and a transparent layer quartz glass portion, the method including: a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, in which: the transparent layer preparing step includes coating the black quartz glass portion with silica slurry, performing heating treatment in an oxidizing atmosphere in the temperature region of 300° C. to 1,200° C., keeping the resultant within the temperature range of 800° C. or more and 1,500° C. or less and the pressure range of 0.001 to 1.0 MPa to perform sintering; and the silica slurry uses silica particles each having an average particle diameter of 0.5 nm to 100 nm and has a concentration of silica of 1 to 50% and a concentration of an organic binder of 0.05 to 10%.

The organic binder is preferably one of polyvinyl alcohol and methylcellulose.

In the method for producing a black synthetic quartz glass with a transparent layer according to each of the first and second exemplary embodiments of the present invention, the volatile organosilicon compound is preferably an organosilazane, and the organosilazane is more preferably hexamethyldisilazane.

A black synthetic quartz glass with a transparent layer of the present invention is a black synthetic quartz glass with a transparent layer, including: a black quartz glass portion; and a transparent layer quartz glass portion, the black synthetic quartz glass being produced by the production method of the present invention described above, in which: the black quartz glass portion includes a black synthetic quartz glass which: has a light transmittance at 200 to 10,000 nm of 50% or less at a thickness of 1 mm; has a total concentration of metal impurities of 1 ppm or less; contains carbon at a concentration of more than 30 ppm and 50,000 ppm or less; and has a viscosity at 1,280° C. of $10^{11.7}$ poise or more; and the transparent quartz glass portion has characteristics of: having a total concentration of metal impurities of 70 ppm or less; and containing carbon at a concentration of 30 ppm or less.

According to the present invention, it is possible to provide the black synthetic quartz glass with a transparent layer, which is excellent in light shield property, keeps a purity equivalent to that of a synthetic quartz glass in terms of metal impurities, has a high-temperature viscosity characteristic comparable to that of a natural quartz glass, can be subjected to high-temperature processing such as welding, does not release carbon from its surface, is free of bubbles in a transparent layer and a black quartz glass portion, and at an interface between the transparent layer and the black quartz glass, and does not have a crack or the like after being formed into a product. The black synthetic quartz glass with a transparent layer of the present invention may be suitably used for, for example, black quartz glass products including an optical component such as a spectroscopic cell, a light-shielding member for a semiconductor production apparatus, an infrared heat-absorbing member, and a plasma etching-resistant member.

BRIEF DESCRIPTION OF THE DRAWINGS

FIG. 1 is a photograph showing the state of a cross-section of deposition layers of a black synthetic quartz glass body with a transparent layer obtained in Example 1.

DETAILED DESCRIPTION OF THE PREFERRED EMBODIMENTS

Hereinafter, embodiments of the present invention are described. It should be appreciated that these embodiments are shown for illustrative purposes, and various modifications may be made as long as the modifications do not deviate from the technical idea of the present invention.

A black synthetic quartz glass with a transparent layer of the present invention may be produced by the following method. The method for producing a black synthetic quartz glass with a transparent layer according to the present invention includes a black quartz glass preparing step of preparing a black quartz glass portion and a transparent layer preparing step of coating the black quartz glass portion with a transparent layer material, followed by heating treatment.

First, the black quartz glass preparing step is described. A silica porous glass body containing a hydroxy group is subjected to a gas-phase reaction in an atmosphere of a volatile organosilicon compound at a temperature of 100° C. or more and 1,200° C. or less, and after the reaction, the resultant is fired at a temperature of 1,200° C. or more and 2,000° C. or less. The volatile organosilicon compound remains in the silica porous glass body after the gas-phase reaction, and hence a large amount of carbon thermally decomposed by sintering remains. As a result, a black quartz glass portion is formed.

The resultant black quartz glass portion has the following characteristics: carbon remains in the glass body in the range of more than 30 ppm and 50,000 ppm or less; an emissivity in a far infrared region is 0.8 or more; a light transmittance at 200 to 10,000 nm is 50% or less at a thickness of 1 mm; the total concentration of metal impurities is 1 ppm or less; and a viscosity at 1,280° C. is $10^{11.7}$ poise or more.

The silica porous glass body containing a hydroxy group is not particularly limited, but is preferably a synthetic quartz glass porous body prepared by depositing quartz glass fine particles (soot) obtained by subjecting a glass forming raw material to a hydrolysis reaction with an oxygen-hydrogen flame. The glass forming raw material is suitably a silicon compound, and examples of the silicon compound may include silicon halides such as silicon tetrachloride, trichlorosilane, and dichlorosilane, monosilane, and methyltrimethoxysilane. Alternatively, a porous body prepared by a sol-gel method may be used. The concentration of the hydroxy group in the silica porous glass body is preferably 100 ppm to 3,000 ppm.

The volatile organosilicon compound (reaction gas) is not particularly limited, but a silicon compound containing nitrogen is preferably used. In particular, an organosilicon compound having an Si—N bond, i.e., an organosilazane is suitable because of its good reactivity with a hydroxy group, which facilitates the removal of the hydroxy group. In addition, the organosilazane is particularly suitably hexamethyldisilazane because a trace amount of nitrogen can be incorporated and a large increase in the viscosity of the glass body is achieved.

Specific examples of the volatile organosilicon compound to be used in the present invention include silicon acetate, halogenated silanes (such as methyltrichlorosilane and tetrachlorosilane), organoacetoxysilanes (such as acetoxytrimethylsilane), organosilanes (such as methylsilane, tetramethylsilane, allyltrimethylsilane, dimethylsilane, tetraethylsilane, triethylsilane, and tetraphenylsilane), organopolysilanes (such as hexamethyldisilane and hexaethyldisilane), organosilanols (such as trimethylsilanol and diethylsilanediol), trimethyl(trifluoromethanesulfonyloxy)silane, trimethyl(methylthio)silane, azidotrimethylsilane, cyanotrimethylsilane, (ethoxycarbonylmethyl)trimethylsilane, N,O-bis(trimethylsilyl)acetamide, organosiloxanes (such as hexamethyldisiloxane, octamethyltrisiloxane, hexamethylcyclotrisiloxane, hexaphenylcyclotrisiloxane, and octamethylspiro[5.5]pentasiloxane), organosilazanes (such as hexamethyldisilazane, hexaethyldisilazane, hexaphenylsilazane, triethylsilazane, tripropylsilazane, triphenylsilazane, hexamethylcyclotrisilazane, octamethylcyclotetrasilazane, hexaethylcyclotrisilazane, octaethylcyclotetrasilazane, and hexaphenylcyclotrisilazane), alkoxysilanes (such as tetramethoxysilane, methyltrimethoxysilane, dimethyldimethoxysilane, methoxytrimethylsilane, phenyltrimethoxysilane, tetraethoxysilane, methyltriethoxysilane, dimethyldiethoxysilane, phenyltriethoxysilane, diphenyldiethoxysilane, trimethylphenoxysilane, hexyltrimethoxysilane, hexyltriethoxysilane, decyltrimethoxysilane, decyltrimethoxysilane, trifluoropropyltrimethoxysilane, and heptadecatrifluorodecyltrimethoxysilane), organosilanecarboxylic acids (such as trimethylsilylpropionic acid), organosilanethiols (such as trimethylsilanethiol), organosilicon isocyanates (such as trimethylsilicon isocyanate and triphenylsilicon isocyanate), organosilicon isothiocyanates (such as trimethylsilicon isothiocyanate and phenylsilicon triisothiocyanate), organosilthianes (such as hexamethyldisilthiane and tetramethylcyclodisilthiane), and organosilmethylenes (such as hexamethyldisilmethylene and octamethyltrisilmethylene).

The gas-phase reaction does not occur at a reaction temperature of less than 100° C., and when the temperature is more than 1,200° C., the silica porous glass body undergoes densification, with the result that the gas does not diffuse into the silica porous body. Accordingly, the gas-phase reaction is performed at a reaction temperature of 100° C. or more and 1,200° C. or less, preferably 400° C. or more and 900° C. or less. A reaction time is not particularly limited, but is preferably 1 hour to 300 hours, more preferably 10 hours to 100 hours.

Further, when a sintering temperature is more than 2,000° C., the glass body softens to an excessive extent, and thus cannot keep its structure. Accordingly, it is suitable that a temperature range at the time of heating and firing be 1,200° C. or more and 2,000° C. or less, preferably 1,300° C. or more and 1,800° C. or less. A heating and firing time is not particularly limited, but is preferably 1 hour to 30 hours, more preferably 5 hours to 20 hours.

An atmosphere at the time of heating and firing is not particularly limited, and examples thereof include a vacuum and an inert gas. Of those, an inert gas is preferred, and He, nitrogen, Ar, a mixed gas thereof, or the like is more preferred.

Further, prior to supplying the reaction gas to the silica porous glass body, the silica porous glass body is preferably preheated in a reduced-pressure atmosphere for a certain period of time in the temperature range of 100° C. or more and 1,200° C. or less, preferably at a temperature close to the reaction temperature. It is suitable that the porous glass body be allowed to react with the reaction gas after the preheating, followed by the firing.

Further, according to the method of the present invention, there is provided such a high-purity black synthetic quartz glass portion that the total content of metal impurities such as Li, Na, K, Mg, Ti, Fe, Cu, Ni, Cr, and Al is 1 ppm or less (including 0).

A detailed description is made below by taking, as an example, an embodiment mode in which hexamethyldisilazane: [(CH$_3$)$_3$Si]$_2$NH is used as a gas to be used as the reaction gas in the method for producing a black synthetic quartz glass with a transparent layer according to the present invention. First, a porous body is prepared by hydrolyzing tetrachlorosilane by a known method to deposit silica fine particles in layers. The porous body is set in a quartz glass furnace tube provided in an electric furnace, and is heated to a predetermined temperature. At this time, the porous body is preferably kept at a temperature close to the reaction temperature for a certain period of time to remove water adsorbed to the porous body.

Next, a hexamethyldisilazane vapor is flowed while being diluted with a nitrogen gas, so that a hydroxy group bonded to the porous body and hexamethyldisilazane are allowed to react with each other. At this time, a reaction as shown in the following formula (1) is estimated to occur.

$$\text{Si—OH} + [(CH_3)_3Si]_2NH \rightarrow \text{Si—N—}[(CH_3)_3Si]_2 + H_2O \quad (1)$$

After the reaction has been terminated at a reaction temperature of 100 to 1,200° C., the porous body is placed in a heating furnace. Then, vacuuming is started and continued until the degree of vacuum reaches less than 10 mmHg, preferably 5 mmHg or less, more preferably 1 mmHg or less, or atmosphere replacement with an N$_2$ gas is performed. After that, heating is started, and the porous body is subjected to densification at a temperature of 1,200 to 2,000° C. When the heating temperature exceeds about 800° C., a silazane gas remaining in the porous body is decomposed to generate a large amount of free carbon, which remains in the glass body during the heating afterwards, coloring the resultant quartz glass black. Si—N—[(CH$_3$)$_3$Si]$_2$ remaining in the porous body partially forms Si—N or Si—C, thereby contributing to an improvement in viscosity.

Next, the transparent layer preparing step is described.

In a first embodiment mode of the transparent layer preparing step, the transparent layer preparing step includes the steps of coating the black quartz glass with silica slurry, performing heating treatment in an oxidizing atmosphere in the temperature region of 300° C. to 1,200° C., and keeping the resultant within the temperature range of 1,300° C. to 2,000° C. and the pressure range of 0.001 to 1.0 MPa to perform sintering.

In the first embodiment mode of the transparent layer preparing step, the silica slurry is silica slurry prepared from silica particles each having an average particle diameter of 0.1 μm to 100 μm, preferably 0.5 μm to 50 μm, so as to have a concentration of silica of 50 to 95%, preferably 60 to 80%, and a concentration of a cellulose derivative of 0.05 to 10%, preferably 0.1 to 5%. Examples of the cellulose derivative include methylcellulose, hydroxypropylmethylcellulose, and hydroxymethylcellulose. Of those, methylcellulose is preferred.

A method for the coating with the silica slurry is not particularly limited. The black quartz glass body may be immersed in the slurry, or the slurry may be applied thereonto. Spin coating may be employed to form a coating with a uniform thickness. Alternatively, a method involving spray coating may be employed. After the coating, the resultant is dried in the range of ordinary temperature to 300° C.

The heating treatment in the oxidizing atmosphere includes heating treatment in, for example, an oxygen atmosphere or an air atmosphere in the temperature region of 300° C. to 1,200° C., preferably 500° C. to 1,000° C. to decompose and remove organic components such as carbon. A heating treatment time is not particularly limited, but is preferably 0.5 hour to 100 hours, more preferably 2 hours to 40 hours.

When the black synthetic quartz glass is used in a semiconductor production process, it is required to have a high purity, and hence a purification step is introduced after the above-mentioned treatment. That is, heating treatment is performed in an atmosphere containing chlorine, preferably in an HCl gas, in the temperature range of 800° C. to 1,400° C., preferably 1,100° C. to 1,300° C.

In the sintering treatment, the coating layer is sintered in the temperature range of 1,300° C. to 2,000° C., preferably 1,400° C. to 1,700° C. A pressure at the time of the sintering is kept within the pressure range of 0.001 to 1.0 MPa, preferably kept within the pressure range of 0.01 to 0.5 MPa, thereby preventing bubbles from generating in the coating layer or at an interface between the coating layer and the black quartz glass. A sintering time is not particularly limited, but is preferably 0.2 hour to 20 hours, more preferably 1 hour to 10 hours.

The transparent quartz glass portion after the sintering contains metal impurities at a total content of 70 ppm or less (including 0), preferably 50 ppm or less, more preferably 30 ppm or less. When the content of metal impurities is more than 70 ppm, the amount of metal impurities to be released from the surface increases, and in particular, the black synthetic quartz glass is unsuitable as a quartz glass material to be used in a semiconductor production process and causes an electrical abnormality in the produced semiconductor device. When the content is 30 ppm or less, no problem arises.

On the other hand, the concentration of carbon becomes 30 ppm or less, preferably 20 ppm or less, more preferably 10 ppm or less. Carbon, like metal impurities, is considered as a cause of an electric abnormality in the produced semiconductor device in the semiconductor production process, and when its concentration is more than 30 ppm, the black synthetic quartz glass is unsuitable as a quartz glass material to be used in the semiconductor production process. When the concentration is 10 ppm or less, no problem arises.

In a second embodiment mode of the transparent layer preparing step, the transparent layer preparing step includes the steps of coating the black quartz glass with silica slurry, performing heating treatment in an oxidizing atmosphere in the temperature region of 300° C. to 1,200° C., and keeping the resultant within the temperature range of 800° C. or more and 1,500° C. or less and the pressure range of 0.001 to 1.0 MPa to perform sintering.

In the second embodiment mode of the transparent layer preparing step, the silica slurry is silica slurry prepared from silica particles each having an average particle diameter of 0.5 nm to 100 nm, preferably 1 nm to 50 nm, so as to have a concentration of silica of 1 to 50%, preferably 10 to 30%, and a concentration of an organic binder of 0.05 to 10%, preferably 0.1 to 5%. Examples of the organic binder include cellulose-based binders (methylcellulose, carboxymethylcellulose, and hydroxyethyl alcohol), agar, vinyl-based binders (polyvinyl alcohol and polyvinylpyrrolidone), starch-based binders (dialdehyde starch, dextrin, and polylactic acid), acrylic binders (sodium polyacrylate and methyl methacrylate), and viscous substances of plant origin. Of those, polyvinyl alcohol or methylcellulose is suitable.

In the second embodiment mode of the transparent layer preparing step, a method for the coating with the silica slurry and the heating treatment in the oxidizing atmosphere may be performed in the same manner as in the first embodiment mode of the transparent layer preparing step. The temperature range in the sintering treatment is 800° C. to 1,500° C., preferably 900° C. to 1,200° C. As the particle diameter of each silica particle reduces, the reactivity of a particle surface increases and Si—O, Si., Si—Hx, and Si—CHx in the particle surface react at lower temperatures to be converted to Si—O—Si, resulting in a transparent glass. The sintering has only to be performed at the same pressure and for the same sintering time as those in the first embodiment mode of the transparent layer preparing step.

The total concentration of metal impurities and concentration of carbon contained in the transparent quartz glass portion obtained by the second embodiment mode of the transparent layer preparing step are the same as those in the transparent quartz glass portion obtained by the first embodiment mode of the transparent layer preparing step.

According to the present invention, by virtue of densely and uniformly distributing carbon atoms through the gas-phase reaction, the following quartz material can be provided. The material has high-temperature heat resistance comparable to that of natural quartz while maintaining a purity comparable to that of synthetic quartz, and keeps emissivity in a far infrared region and light shield property at high levels of uniformity. In addition, the material has a transparent synthetic quartz glass layer formed on its surface, the layer having a high purity, being free of bubbles and foreign matter, and releasing no gas, and hence even when used in a high-temperature region, the material does not deform, does not have any surface abnormality such as devitrification, and is applicable in a high purity process such as a semiconductor production process.

EXAMPLES

Hereinafter, the present invention is more specifically described with reference to examples. It should be appreciated that these examples are shown for illustrative purposes and not to be construed as limitative.

Example 1

Silica slurry was prepared by the following method.

43 g of water at 80° C. or more were loaded into a beaker, 2 g of an emulsion-based binder (BIND CERAM WA320, manufactured by Mitsui Chemicals, Inc.), 0.1 g of a dispersant (Celuna D305, manufactured by NOF CORPORATION), 0.1 g of methylcellulose (METOLOSE SM-1500, manufactured by Shin-Etsu Chemical Co., Ltd.), and 100 g of silica powder (Admafine SO-E5, manufactured by Admatechs Company Limited, particle diameter distribution: 0.5 to 4.0 μm, average particle diameter: 1.6 μm, total concentration of metal impurities: 50 ppm) were added, and the mixture was stirred. Subsequently, the beaker was cooled in cold water at about 5° C., and the METOLOSE dissolved in about 3 to 5 minutes after the cooling to cause an increase in viscosity. After that, the contents were transferred to a resin container, and nylon coated iron balls were put into the container. Then, the contents were subjected to aging (treatment for preventing aggregation, reducing viscous property, and removing bubbles) on a rotator for 48 hours. Thus, silica slurry containing silica, methylcellulose, the binder, and water at concentrations of 60%, 8%, 0.5%, and 31.5%, respectively was obtained.

About 1 kg of a quartz glass porous body (hydroxy group concentration: 1,000 ppm) having a columnar shape with a diameter of 100 mm obtained by depositing a number of quartz glass layers through flame hydrolysis of tetrachlorosilane was set in a quartz glass furnace tube (diameter: 200 mm) mounted in an electric furnace. Next, the air inside the furnace tube was evacuated, and the furnace tube was then heated to 500° C. and preheated at this temperature for 60 minutes.

After that, the temperature was increased to a reaction temperature, and a hexamethyldisilazane gas vapor was supplied as a reaction gas while being diluted with an $N_2$ gas, to be allowed to react with a hydroxy group in the porous body. Heating was performed by keeping a reaction temperature of 400° C. for a reaction time of 10 hours. It should be noted that the flow rate of the $N_2$ gas is 1 mol/Hr.

After the completion of the reaction, the treated porous body was transferred to a heating furnace, and was then fired at a pressure of 0.001 MPa in an $N_2$ gas at a temperature of 1,500° C. for 1 hour to give a black synthetic quartz glass body.

A plate measuring 20×5×50 mm was cut out of the resultant black synthetic quartz glass body. Without any further treatment of the cut surfaces, the plate was degreased with ethyl alcohol and washed with pure water. After that, the plate was immersed in the prepared quartz glass slurry for 1 minute, and was then pulled up. As a result, a slurry layer was uniformly formed on the surface of the plate.

The plate having a slurry layer formed thereon was kept in a quartz glass tube having an inner diameter of 200 mm in an air atmosphere at 70° C. for 10 hours to remove water from the slurry layer. In addition, the temperature was increased at 10° C./min, and the plate was kept at 600° C. for 1 hour while oxygen was flowed at 2 L/min, to remove organic matter. Then, the temperature was further increased, and the plate was kept at 1,200° C. for 3 hours while HCl was flowed at 1 L/min, to remove metal impurities.

The resultant black quartz plate with a slurry layer was placed in a vacuum, and vacuuming was performed while the temperature was increased at a rate of 15° C./min to 1,000° C. After that, nitrogen was introduced, the ambient pressure was set to 0.1 MPa, and the black quartz plate was heated to 1,600° C. and kept for 2 hours. Then, the heating was finished.

The resultant black quartz plate had a transparent quartz glass layer having a thickness of 0.1 mm formed in its surface portion.

The resultant black synthetic quartz glass body with a transparent layer was cut and observed from the direction of a cross-section of the deposition layers. FIG. 1 is a photograph of the black synthetic quartz glass body with a transparent layer of Example 1 as observed from the direction of the cross-section. As shown in FIG. 1, a transparent layer is formed from the surface of the glass body to a depth of 0.1 mm, and on the inside thereof, a black quartz glass portion was formed. No bubble was observed in each of the transparent quartz glass layer and the black quartz glass, and at an interface therebetween.

The resultant black synthetic quartz glass with a transparent layer was subjected to the following measurements. Table 2 shows the results.

The black portion was measured for its transmittance of light having wavelengths of 200 to 10,000 nm at a thickness of 1 mm. Further, the black portion and the transparent portion were each measured for its contents of Li, Na, K, Mg, Ti, Fe, Cu, Ni, Cr, and Al by an ICP mass spectrometry method. Table 2 shows the total content of the metals. The content of an OH group was calculated by measuring the amount of characteristic absorption in an infrared region by FTIR. The transparent layer portion and black quartz portion of the resultant black synthetic quartz glass with a transparent layer were each measured for its carbon (C) concentration by a combustion-infrared absorption method. In addition, each portion was subjected to heating to 1,280° C., followed by the measurement of its viscosity (unit: poise) at that temperature by a beam bending method, the determination of the color of the quartz glass based on visual observation, and the confirmation of the present or absence of bubbles/foreign matter.

Further, the resultant black quartz glass sample with a transparent layer was subjected to thermal desorption gas analysis. Table 2 shows the resultant ion current value which indicates a $CO_2$ gas amount.

Examples 2 to 5

Black synthetic quartz glass bodies with a transparent layer were obtained under the same treatment conditions as in Example 1 except for changing the conditions as shown in Table 1. Table 2 shows the results of measurements performed in the same manner as in Example 1.

Comparative Examples 1 to 4

Black synthetic quartz glass bodies with a transparent layer were obtained under the same treatment conditions as in Example 1 except for changing the conditions as shown in Table 1. Table 2 shows the results of measurements performed in the same manner as in Example 1.

TABLE 1

| | Slurry composition | | | | Conditions for formation of transparent layer | | |
|---|---|---|---|---|---|---|---|
| | Silica particle | | Organic binder | | Firing temperature ( ) | Firing time (Hr) | Pressure (MPa) |
| | Concentration (%) | Average particle diameter (μm) | Kind | Concentration (%) | | | |
| Example 1 | 60 | 1.6 | Methylcellulose | 5.0 | 1600 | 2 | 0.1 |
| Example 2 | 80 | 50 | Methylcellulose | 2.0 | 1600 | 2 | 0.1 |
| Example 3 | 30 | 0.050 | Methylcellulose | 2.0 | 1100 | 3 | 0.3 |
| Example 4 | 20 | 0.030 | Polyvinyl alcohol | 3.0 | 1100 | 3 | 0.3 |
| Example 5 | 3 | 0.005 | Polyvinyl alcohol | 5.0 | 1100 | 30 | 0.3 |

TABLE 1-continued

| | Slurry composition | | | | Conditions for formation of transparent layer | | |
|---|---|---|---|---|---|---|---|
| | Silica particle | | Organic binder | | Firing | Firing | |
| | Concentration (%) | Average particle diameter (μm) | Kind | Concentration (%) | temperature ( ) | time (Hr) | Pressure (MPa) |
| Comparative Example 1 | 45 | 0.05 | Methylcellulose | 11.0 | 1600 | 2 | 0.1 |
| Comparative Example 2 | 98 | 110 | Methylcellulose | 0.04 | 1600 | 2 | 0.1 |
| Comparative Example 3 | 60 | 0.005 | Methylcellulose | 0.04 | 1100 | 2 | 0.1 |
| Comparative Example 4 | 0.5 | 0.005 | Methylcellulose | 11.5 | 1100 | 2 | 0.1 |

TABLE 2

| | Black layer | | | | | Transparent layer | | | | | |
|---|---|---|---|---|---|---|---|---|---|---|---|
| | Trans-mittance (%) | Metal impurities (ppm) | OH group concentration (ppm) | C concentration (ppm) | Viscosity 1280° C. (log η) | Metal impurities (ppm) | OH group concentration (ppm) | C concentration (ppm) | Thickness (mm) | Bubbles and foreign matter | $CO_2$ ion current (A) |
| Example 1 | 0-1.0 | 0.1 | <1 | 500 | 12.0 | 49 | <5 | 5 | 0.1 | Absent | 1.0E-11 |
| Example 2 | 0-1.0 | 0.1 | <1 | 500 | 11.9 | 32 | <5 | 10 | 0.8 | Absent | 1.1E-11 |
| Example 3 | 0-1.0 | 0.1 | <1 | 500 | 12.0 | 30 | <5 | 5 | 0.4 | Absent | 0.9E-11 |
| Example 4 | 0-1.0 | 0.1 | <1 | 500 | 12.0 | 20 | <5 | 5 | 0.4 | Absent | 0.9E-11 |
| Example 5 | 0-1.0 | 0.1 | <1 | 500 | 12.1 | 42 | <5 | 10 | 0.1 | Absent | 1.2E-11 |
| Comparative Example 1 | 0-1.0 | 0.1 | <1 | 500 | 12.0 | 79 | <5 | 5 | 0.4 | Large numbers of bubbles and cracks | 1.6E-12 |
| Comparative Example 2 | 0-1.0 | 0.1 | <1 | 500 | 11.9 | 42 | <5 | 10 | 0.8 | Large number of bubbles | 1.4E-13 |
| Comparative Example 3 | 0-1.0 | 0.1 | <1 | 500 | 12.0 | 20 | <5 | 5 | 0.6 | Crack | 2.0E-12 |
| Comparative Example 4 | 0-1.0 | 0.1 | <1 | 500 | 12.1 | 82 | <5 | 10 | 0.1 | Crack | 1.9E-12 |

As shown in Table 2, the black synthetic quartz glass with a transparent layer obtained in each of Examples 1 to 5 is such a material as described below. The material is excellent in light shield property, keeps a purity equivalent to that of a synthetic quartz glass in terms of metal impurities, has a high-temperature viscosity characteristic comparable to that of a natural quartz glass using natural rock crystal as a raw material, and has a transparent synthetic quartz glass layer free of carbon in its surface, thereby not releasing carbon from its surface. Further, the transparent quartz glass layer and the black quartz glass body are completely integrated with each other after their formation. Hence, no bubble or devitrified portion was generated at their interface. In addition, in a temperature region in which a quartz glass is generally used, there was no occurrence of peeling of the transparent layer or generation of a crack.

What is claimed is:

1. A black synthetic quartz glass with a transparent layer, comprising:
    a black quartz glass portion;
    a transparent layer quartz glass portion; and
    an interface between the black quartz glass portion and the transparent layer quartz glass portion, the black synthetic quartz glass being produced by a production method comprising:

a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less;

a transparent layer preparing step of coating the black quartz glass portion with a transparent layer material, followed by heating treatment, wherein:

the transparent layer preparing step comprises coating the black quartz glass portion with silica slurry, performing heating treatment in an oxidizing atmosphere in a temperature region of 300° C. to 1,200° C., and keeping the resultant within a temperature range of 1,300° C. to 2,000° C. and a pressure range of 0.001 to 1.0 Mpa to perform sintering; and the silica slurry uses silica particles each having an average particle diameter of 0.1 μm to 100 μm and has a concentration of silica of 50% to 95% and a concentration of a cellulose derivative of 0.05% to 10%, wherein:

the black quartz glass portion comprises a black synthetic quartz glass which:

has a light transmittance at 200 to 10,000 nm of 50% or less at a thickness of 1 mm;

has a total concentration of metal impurities of 1 ppm or less;

contains carbon at a concentration of more than 30 ppm and 50,000 ppm or less; and has a viscosity at 1,280° C. of $10^{11.7}$ poise or more; and the transparent quartz glass portion has characteristics of:

having a total concentration of metal impurities of 70 ppm or less; and containing carbon at a concentration of 30 ppm or less, wherein the black quartz glass portion, the transparent layer quartz glass portion and the interface therebetween are free of bubbles and foreign matter.

2. A black synthetic quartz glass with a transparent layer, comprising:

a black quartz glass portion;

a transparent layer quartz glass portion; and an interface between the black quartz glass portion and the transparent layer quartz glass portion, the black synthetic quartz glass being produced by a production method comprising:

a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, wherein:

the transparent layer preparing step comprises coating the black quartz glass portion with silica slurry, performing heating treatment in an oxidizing atmosphere in a temperature region of 300° C. to 1,200° C., and keeping the resultant within a temperature range of 1,300° C. to 2,000° C. and a pressure range of 0.001 to 1.0 MPa to perform sintering; and the silica slurry uses silica particles each having an average particle diameter of 0.1 μm to 100 μm and has a concentration of silica of 50 to 95% and a concentration of a cellulose derivative of 0.05 to 10%, wherein the cellulose derivative comprises methylcellulose, wherein the black quartz glass portion comprises a black synthetic quartz glass having a light transmittance at 200 to 10,000 nm of 50% or less at a thickness of 1 mm, said black synthetic quartz glass having a total concentration of metal impurities of 1 ppm or less, said black synthetic quartz glass containing carbon at a concentration of more than 30 ppm and 50,000 ppm or less and said black synthetic quartz glass having a viscosity at 1,280° C. of $10^{11.7}$ poise or more, said transparent quartz glass portion having a total concentration of metal impurities of 70 ppm or less, said transparent quartz glass portion containing carbon at a concentration of 30 ppm or less, wherein the black quartz glass portion, the transparent layer quartz glass portion and the interface therebetween are free of bubbles and foreign matter.

3. A black synthetic quartz glass with a transparent layer, comprising:

a black quartz glass portion;

a transparent layer quartz glass portion; and an interface between the black quartz glass portion and the transparent layer quartz glass portion, the black synthetic quartz glass being produced by a production method comprising:

a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, wherein:

the transparent layer preparing step comprises coating the black quartz glass portion with silica slurry, performing heating treatment in an oxidizing atmosphere in a temperature region of 300° C. to 1,200° C., and keeping the resultant within a temperature range of 800° C. or more and 1,500° C. or less and a pressure range of 0.001 to 1.0 MPa to perform sintering; and the silica slurry uses silica particles each having an average particle diameter of 0.5 nm to 100 nm and has a concentration of silica of 1 to 50% and a concentration of an organic binder of 0.05 to 10%, wherein the black quartz glass portion comprises a black synthetic quartz glass having a light transmittance at 200 to 10,000 nm of 50% or less at a thickness of 1 mm, said black synthetic quartz glass having a total concentration of metal impurities of 1 ppm or less, said black synthetic quartz glass containing carbon at a concentration of more than 30 ppm and 50,000 ppm or less, said black synthetic quartz glass having a viscosity at 1,280° C. of $10^{11.7}$ poise or more, said transparent quartz glass portion having a total concentration of metal impurities of 70 ppm or less, said transparent quartz glass portion containing carbon at a concentration of 30 ppm or less, wherein the black quartz glass portion, the transparent layer quartz glass portion and the interface therebetween are free of bubbles and foreign matter.

4. A black synthetic quartz glass with a transparent layer, comprising:

a black quartz glass portion;

a transparent layer quartz glass portion; and an interface between the black quartz glass portion and the transparent layer quartz glass portion, the black synthetic quartz glass being produced by a production method comprising:

a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, wherein:

the transparent layer preparing step comprises coating the black quartz glass portion with silica slurry, performing heating treatment in an oxidizing atmosphere in a temperature region of 300° C. to 1,200° C., and keeping the resultant within a temperature range of 800° C. or more and 1,500° C. or less and a pressure range of 0.001 to 1.0 MPa to perform sintering; and the silica slurry uses silica particles each having an average particle diameter of 0.5 nm to 100 nm and has a concentration of silica of 1 to 50% and a concentration of an organic binder of 0.05 to 10%, wherein the organic binder comprises one of polyvinyl alcohol and methylcellulose, wherein the black quartz glass portion comprises a black synthetic quartz glass which has a light transmittance at 200 to 10,000 nm of 50% or less at a thickness of 1 mm, said black synthetic quartz glass having a total concentration of metal impurities of 1 ppm or less, said black synthetic quartz glass containing carbon at a concentration of more than 30 ppm and 50,000 ppm or less, said black synthetic quartz glass having a viscosity at 1,280° C. of $10^{11.7}$ poise or more, said transparent quartz glass portion having a total concentration of metal impurities of 70 ppm or less, said transparent quartz glass portion containing carbon at a concentration of 30 ppm or less, wherein the black quartz glass portion, the transparent layer quartz glass portion and the interface therebetween are free of bubbles and foreign matter.

5. A black synthetic quartz glass with a transparent layer, comprising:

a black quartz glass portion;

a transparent layer quartz glass portion; and an interface between the black quartz glass portion and the transparent layer quartz glass portion, the black synthetic quartz glass being produced by a production method comprising:

a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, wherein:

the transparent layer preparing step comprises coating the black quartz glass portion with silica slurry, performing heating treatment in an oxidizing atmosphere in a temperature region of 300° C. to 1,200° C., and keeping the resultant within a temperature range of 1,300° C. to 2,000° C. and a pressure range of 0.001 to 1.0 MPa to perform sintering; and the silica slurry uses silica particles each having an average particle diameter of 0.1 μm to 100 μm and has a concentration of silica of 50 to 95% and a concentration of a cellulose derivative of 0.05 to 10%, wherein the volatile organosilicon compound comprises an organosilazane, wherein the black quartz glass portion comprises a black synthetic quartz glass, said black synthetic quartz glass having a light transmittance at 200 to 10,000 nm of 50% or less at a thickness of 1 mm, said black synthetic quartz glass having a total concentration of metal impurities of 1 ppm or less, said black synthetic quartz glass containing carbon at a concentration of more than 30 ppm and 50,000 ppm or less, said black synthetic quartz glass having a viscosity at 1,280° C. of $10^{11.7}$ poise or more, said transparent quartz glass portion having a total concentration of metal impurities of 70 ppm or less, said transparent quartz glass portion containing carbon at a concentration of 30 ppm or less, wherein the black quartz glass portion, the transparent layer quartz glass portion and the interface therebetween are free of bubbles and foreign matter.

6. A black synthetic quartz glass with a transparent layer, comprising:

a black quartz glass portion;

a transparent layer quartz glass portion; and an interface between the black quartz glass portion and the transparent layer quartz glass portion, the black synthetic quartz glass being produced by a production method comprising:

a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, wherein:

the transparent layer preparing step comprises coating the black quartz glass portion with silica slurry, performing heating treatment in an oxidizing atmosphere in a temperature region of 300° C. to 1,200° C., and keeping the resultant within a temperature range of 800° C. or more and 1,500° C. or less and a pressure range of 0.001 to 1.0 MPa to perform sintering; and the silica slurry uses silica particles each having an average particle diameter of 0.5 nm to 100 nm and has a concentration of silica of 1 to 50% and a concentration of an organic binder of 0.05 to 10%, wherein the volatile organosilicon compound comprises an organosilazane, wherein the black quartz glass portion comprises a black synthetic quartz glass having a light transmittance at 200 to 10,000 nm of 50% or less at a thickness of 1 mm, said black synthetic quartz glass having a total concentration of metal impurities of 1 ppm or less, said black synthetic quartz glass containing carbon at a concentration of more than 30 ppm and 50,000 ppm or less, said black synthetic quartz glass having a viscosity at 1,280° C. of $10^{11.7}$ poise or more, said transparent quartz glass portion having a total concentration of metal impurities of 70 ppm or less, said transparent quartz glass portion containing carbon at a concentration of 30 ppm or less, wherein the black quartz glass portion, the transparent layer quartz glass portion and the interface therebetween are free of bubbles and foreign matter.

7. A black synthetic quartz glass with a transparent layer, comprising:

a black quartz glass portion;

a transparent layer quartz glass portion; and an interface between the black quartz glass portion and the transparent layer quartz glass portion, the black synthetic quartz glass being produced by a production method comprising:

a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, wherein:

the transparent layer preparing step comprises coating the black quartz glass portion with silica slurry, performing heating treatment in an oxidizing atmosphere in a temperature region of 300° C. to 1,200° C., and keeping the resultant within a temperature range of 1,300° C. to 2,000° C. and a pressure range of 0.001 to 1.0 MPa to perform sintering; and the silica slurry uses silica particles each having an average particle diameter of 0.1 μm to 100 μm and has a concentration of silica of 50 to 95% and a concentration of a cellulose derivative of 0.05 to 10%, wherein the volatile organosilicon compound comprises an organosilazane, the organosilazane comprising hexamethyldisilazane, wherein the black quartz glass portion comprises a black synthetic quartz glass which has a light transmittance at 200 to 10,000 nm of 50% or less at a thickness of 1 mm, said black synthetic quartz glass having a total concentration of metal impurities of 1 ppm or less, said black synthetic quartz glass containing carbon at a concentration of more than 30 ppm and 50,000 ppm or less, said black synthetic quartz glass having a viscosity at 1,280° C. of $10^{11.7}$ poise or more, said transparent quartz glass portion having a total concentration of metal impurities of 70 ppm or less, said transparent glass portion containing carbon at a concentration of 30 ppm or less, wherein the black quartz glass portion, the transparent layer quartz glass portion and the interface therebetween are free of bubbles and foreign matter.

8. A black synthetic quartz glass with a transparent layer, comprising:

a black quartz glass portion;

a transparent layer quartz glass portion; and an interface between the black quartz glass portion and the transparent layer quartz glass portion, the black synthetic quartz glass being produced by a production method comprising:

a black quartz glass preparing step of preparing a black quartz glass portion by subjecting a silica porous glass body containing a hydroxy group to a gas-phase reaction in an atmosphere of a volatile organosilicon compound at a temperature of 100° C. or more and 1,200° C. or less, and after the reaction, firing the resultant at a temperature of 1,200° C. or more and 2,000° C. or less; and a transparent layer preparing step of coating the black quartz glass portion with a transparent layer material, followed by heating treatment, wherein:

the transparent layer preparing step comprises coating the black quartz glass portion with silica slurry, performing heating treatment in an oxidizing atmosphere in a temperature region of 300° C. to 1,200° C., and keeping the resultant within a temperature range of 800° C. or more and 1,500° C. or less and a pressure range of 0.001 to 1.0 MPa to perform sintering; and the silica slurry uses silica particles each having an average particle diameter of 0.5 nm to 100 nm and has a concentration of silica of 1 to 50% and a concentration of an organic binder of 0.05 to 10%, wherein the volatile organosilicon compound comprises an organosilazane, the organosilazane comprising hexamethyldisilazane, wherein the black quartz glass portion comprises a black synthetic quartz glass which has a light transmittance at 200 to 10,000 nm of 50% or less at a thickness of 1 mm, said black quartz glass portion having a total concentration of metal impurities of 1 ppm or less, said black quartz glass portion containing carbon at a concentration of more than 30 ppm and 50,000 ppm or less, said black quartz glass portion having a viscosity at 1,280° C. of $10^{11.7}$ poise or more, said transparent quartz glass portion having a total concentration of metal impurities of 70 ppm or less, said transparent quartz glass portion containing carbon at a concentration of 30 ppm or less, wherein the black quartz glass portion, the transparent layer quartz glass portion and the interface therebetween are free of bubbles and foreign matter.

* * * * *